United States Patent [19]

Agostino

[11] Patent Number: 5,420,463
[45] Date of Patent: May 30, 1995

[54] FLUID DRIVEN POWER SYSTEM

[76] Inventor: Michael Agostino, 221 Spring St., St. Augustine, Fla. 32095

[21] Appl. No.: 716,643

[22] Filed: Jun. 17, 1991

Related U.S. Application Data

[63] Continuation-in-part of Ser. No. 483,535, Jan. 8, 1990.

[51] Int. Cl.⁶ .............................................. F03B 13/00
[52] U.S. Cl. ........................................ 290/54; 290/53
[58] Field of Search ...................................... 290/54, 53

[56] References Cited

U.S. PATENT DOCUMENTS

| | | | |
|---|---|---|---|
| 3,993,913 | 11/1976 | Dickman | 290/53 |
| 4,717,831 | 1/1988 | Kikuchi | 290/54 |
| 4,973,856 | 11/1990 | Loreto | 290/54 |

FOREIGN PATENT DOCUMENTS

| | | | |
|---|---|---|---|
| 129770 | 10/1981 | Japan | 290/54 |
| 186368 | 10/1983 | Japan | 290/54 |
| 1519947 | 8/1978 | United Kingdom | 290/54 |
| 9003515 | 4/1990 | WIPO | 290/54 |

*Primary Examiner*—A. D. Pellinen
*Assistant Examiner*—Robert Lloyd Hoover
*Attorney, Agent, or Firm*—Arthur G. Yeager

[57] ABSTRACT

An elongated channel has an entrance leg and a parallel exit leg and a loop therebetween at one end and a sump at the other end into which the exit leg empties. A power supply operates a fluid in the sump to deliver fluid into the entrance leg. A plurality of spaced paddle wheels are mounted for rotation on supports above the channel with each paddle wheel having a plurality of spaced substantially radially directed paddles conforming in shape to the space within the channel and being slightly spaced therefrom to inhibit any contact therewith. A plurality of generators are driven by the plurality of paddle wheels, and the generators are coupled to utilization or storage devices for using or storing the energy harnessed by the generators. Additional intermediate legs of the channel and other loops can form a sineous path from the location of delivery of fluid by the pump to the location of emptying of the exit leg into the sump. The paddle wheels in the exit legs are offset from the paddle wheels in the entrance legs, so that a plurality of elongated shafts can connect aligned paddle wheels in the entrance legs, and another plurality of elongated shafts can connect aligned paddle wheels in the exit legs. The generators are connected to the plurality and another plurality of the shafts. The channel may be level with the sump disposed below or it may be slightly higher in elevation at the location of delivery of the fluid into the entrance channel and descend in elevation at the location of emptying of the exit leg into the sump.

2 Claims, 2 Drawing Sheets

FLUID DRIVEN POWER SYSTEM

CROSS REFERENCE TO RELATED APPLICATION

This application is a continuation-in-part of application Ser. No. 07/483,535, filed Jan. 8, 1990, entitled WATER FLOW GENERATOR.

BACKGROUND OF THE INVENTION

1. Field of the Invention

This invention relates to a fluid driven power system and particularly to the generation of electricity by the energy of fluids, like water, in a continuous channel wherein the flowing water releases its energy.

2. Description of the Prior Art

There have been many prior inventions which employ water powered paddle wheels, such as U.S. Pat. No. 4,973,856 granted to Pellegrini Loreto, and other well known extractors of energy such as turbines, etc., in run-of-river plants and in plants from reservoirs and dams. In such plants, turbines between the inlets and outlets convert the head of water into electric power.

In the present invention the flow of fluid as it seeks its own level is maximized to more efficiently obtain more of the energy in such a recharged flow of fluid than in prior arrangements.

SUMMARY OF THE INVENTION

In one aspect this invention provides an improved fluid driven power system which employs a closed loop formed from an elongated U-shaped channel having a bottom and upstanding side walls and having an entrance leg and an exit leg and a loop means therebetween and a sump oppositely disposed from the loop means into which the exit leg empties. A pump means, energized by power means, in the sump delivers fluid into the entrance leg of the channel and a plurality of spaced paddle wheels are mounted on supports above the channel. Each of the paddle wheels has a plurality of spaced substantially radially directed paddles conforming in shape to the space between the side walls and bottom wall of the channel and being located in the channel but spaced slightly therefrom to inhibit any contact therewith. A plurality of generators are coupled to and driven by the plurality of paddle wheels. Utilization or storage means are connected to the generators for using or storing the energy harnessed by the generators from the fluid seeking its own level in the channel.

Each generator may be coupled to a respective paddle wheel or coupled otherwise. For example, the loop means may include an intermediate entrance leg and an intermediate exit leg and three loops with each leg being substantially parallel to each other. The entrance loop is connected to the intermediate exit leg by one loop; the intermediate exit loop is connected to the intermediate entrance loop by a second loop; and the intermediate entrance leg is connected to the exit leg by a third loop thereby forming a sinuous path from the location of delivery of fluid by the pump to the location of emptying of the exit leg into the sump. Further aspects are seen wherein the paddle wheels in the exit legs are offset from the paddle wheels in entrance legs, and a plurality of elongated shafts respectively connect aligned paddle wheels in the entrance legs. Another plurality of elongated shafts respectively connect aligned paddle wheels in the exit legs with the generators being respectively connected to the plurality and another plurality of the shafts. The channel of this system may be level or the channel may be slightly higher in elevation at the location of delivery of the fluid into the entrance channel than the elevation at the location of emptying of the exit leg into the sump.

BRIEF DESCRIPTION OF THE DRAWINGS

The novel features which are believed to be characteristic of this invention are set forth with particularity in the appended claims The invention itself, however, both as to its organization and method of operation, together with further objects and advantages thereof, may best be understood by reference to the following description taken in connection with the accompanying drawings, in which:

DETAILED DESCRIPTION OF THE INVENTION

Figure 1:
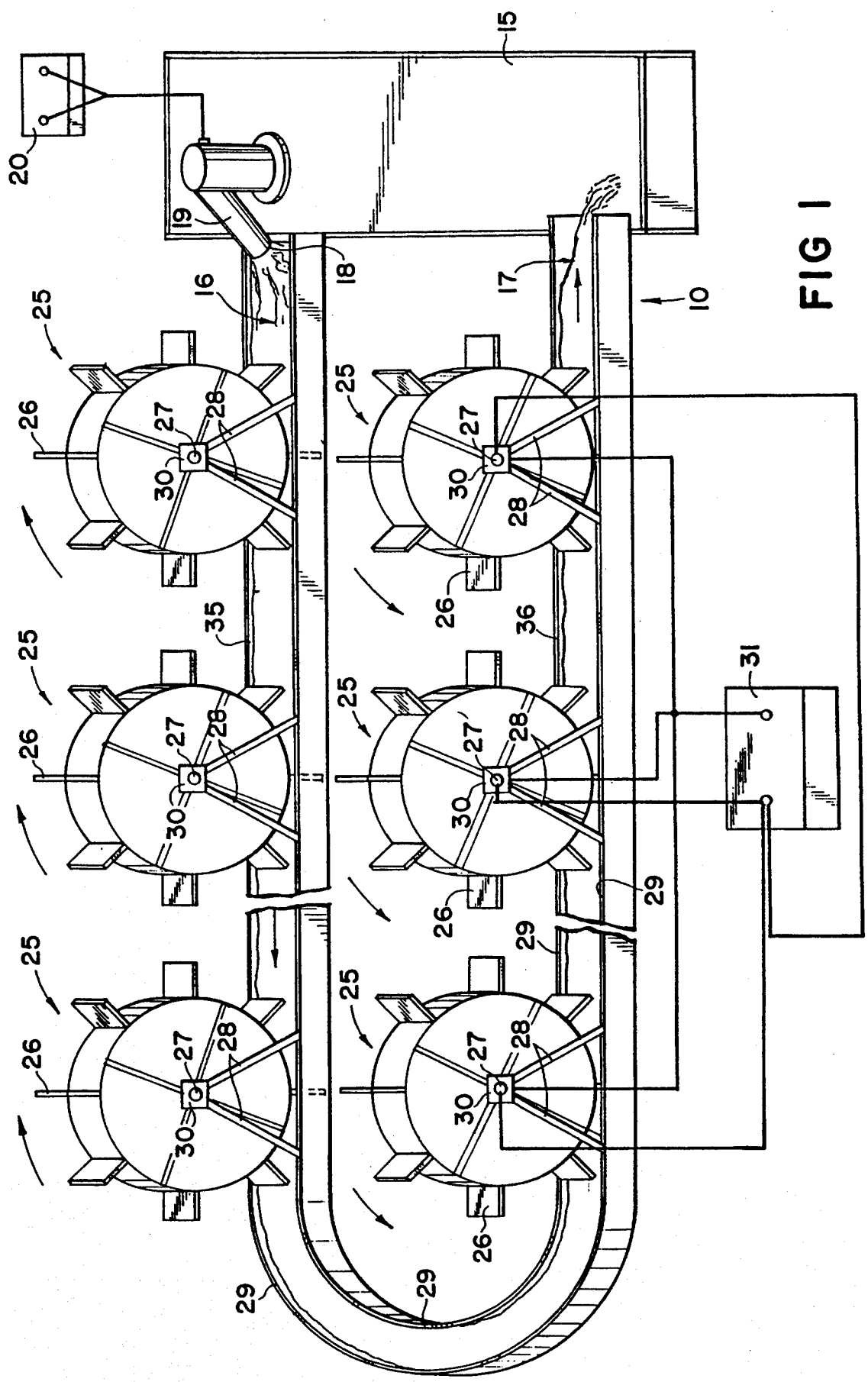
FIG. 1 is a pictorial view of the power system according to the first embodiment of the invention.

Referring now more particularly to the drawing of FIG. 1, the power system 10 of the invention is illustrated in the form of a U-shaped level or slightly sloped canal or channel 11 having a bottom 12 and upstanding side walls 13 and 14. A sump or tank 15 is located below each of the entrance and exit ends 16 and 17 of channel 11 so that water enters end 16 which is suitably blocked except for the outlet 18 from a d.c. water pump 19 which is driven from a storage battery 20 or an a.c. water pump driven from an a.c. electrical supply. Thus water flows from tank 15 through pump 19 out outlet 18 into the channel 11 and as the water seeks its own level flows along the channel 11 and out exit end 17 into the tank 15 and the cycle is continuously repeated.

Spaced along channel 11 are a series of paddle wheels 25 which paddles 26 generally correspond to the channel 16 but are free of any contact with the bottom 12 or side walls 13 and 14 of channel 16. The paddle wheels 25 are mounted for rotation about substantially parallel and horizontal axles 27 journalled on supports 28 spaced remotely above the upper edge 29 of channel 16. Axles 27 rotate with paddle wheels 25 and respectively drive suitable generators 30, for example, also mounted on supports 28. The generators are electrically connected to a utilization device or storage battery 31.

As the water at the entrance end 16 increases by the water therein exiting from outlet 18 of pump 19, the first paddle wheel 25 will rotate in the clockwise direction, as will the second, third, etc., on the down leg 36 of the channel 16. The paddle wheels on the return leg 36 will accordingly be rotating counter-clockwise. After the initial start up and with the load on each paddle wheel 25 being equal, the rotative speed of each paddle wheel 25 will be equalized, assuming all wheels are identical, friction, etc., and load are identical and discounting any pressure of the water from outlet 18 onto the first paddle wheel 25. The paddle wheels 25 each are forcibly turned one after the other as the water seeks its own level along the channel 11 and this energy of the water is thus serially harnessed by each paddle wheel as the water travels along its path in the channel 11 from entrance end 16 to exit end 17. In contradistinction, U.S. Pat. No. 4,973,856 employs the weight of the water in the spaces between the blades to cause rotation of its rotor.

As hereinabove indicated, the channel 11 may be level or have a slight slope from entrance 16 to exit 17 before dropping slightly into the sump 15.

Figure 2:
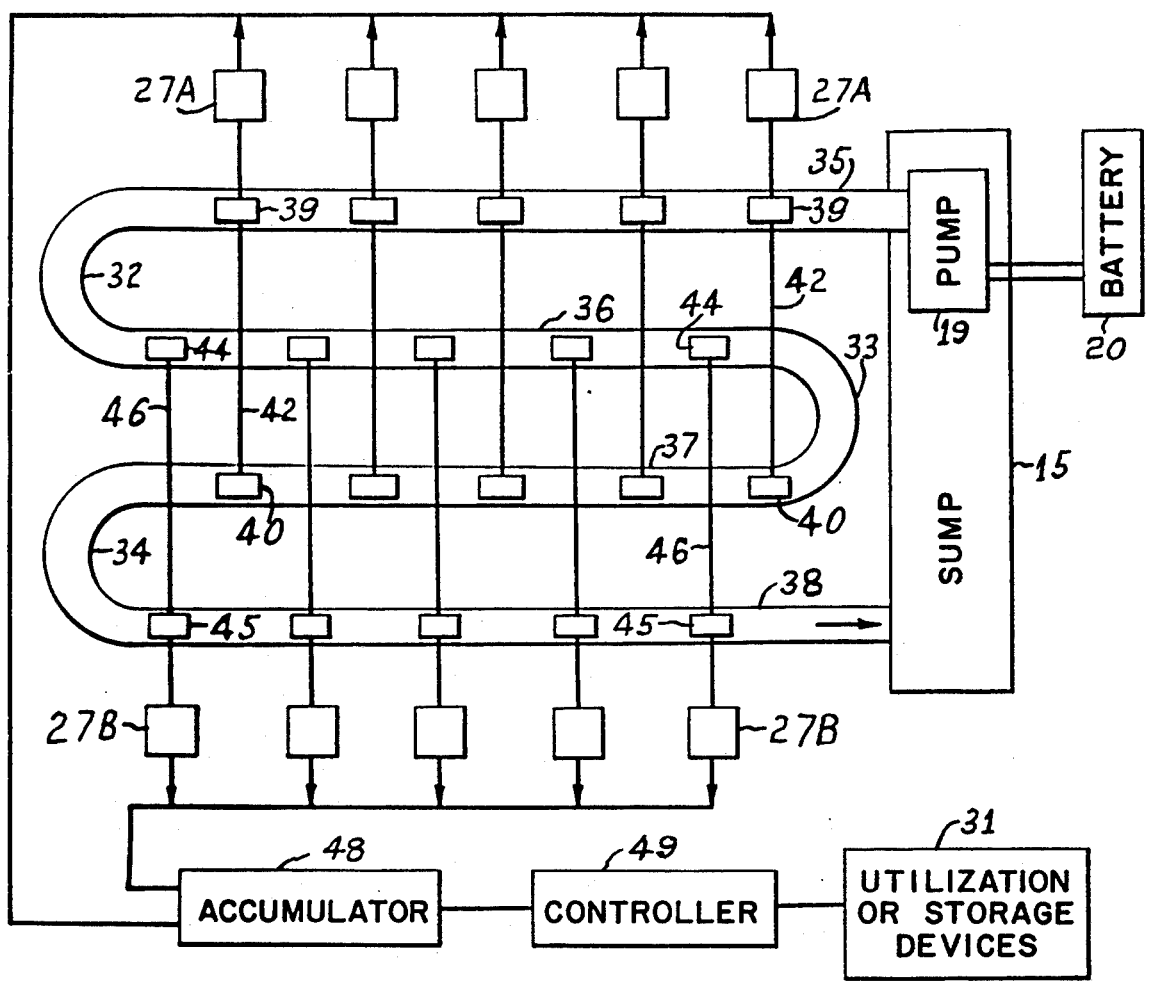
FIG. 2 is a diagrammatic top plan view of the power system according to the second embodiment of the invention.

In FIG. 2 the invention is shown in a continuous or closed form as having a first entrance channel leg 35, a first return leg 36, a second entrance leg 37 and second return leg 38. The purpose of this construction is so paddle wheels 39 and 40 which are aligned and located in respective entrance legs 35 and 37 may be coupled together by shaft 42 to drive generator 27A, while paddle wheels 44 and 45 in respective first and second return legs 36 and 38 are coupled together by shaft 46 to drive generator 27B. The outputs of all of the generators 27A and 27B are supplied to an accumulator 48 via a controller 49 into a utilization device or storage device 31.

It is to be understood that the construction of the FIG. 2 embodiment is substantially identical to FIG. 1, except that instead of a single loop 32 between entrance leg 16 and exit leg 17, FIG. 2 requires another loop 33 between first exit leg 36 and second entrance leg 37 and a third loop 34 between second entrance leg 37 and second exit leg 38.

Thus the longer the channel 11 and the more paddle wheels 25 the greater the energy harnessed by the wheels as the water seeks its own level in the channel 11 assuming no frictional losses. Of course, rather than driving generators, the paddle wheels could be coupled to directly drive utilization devices, such as grain grinders or wood chippers or the like. Thus the energy stored in the battery 20 is efficiently converted via the fluid and paddle wheels into mechanical energy.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A fluid driven power system comprising a closed loop including an elongated U-shaped channel having a bottom and upstanding side walls and having an entrance leg and an exit leg and a loop means therebetween and a sump oppositely disposed from said loop means into which said exit leg empties, pump means in said sump to deliver fluid into said entrance leg, power means for powering said pump means;

wherein said loop means includes an intermediate entrance leg and an intermediate exit leg and three loops with each said leg being substantially parallel to each other, said entrance loop being connected to said intermediate exit leg by one said loop, said intermediate exit loop being connected to said intermediate entrance loop by a second said loop, and said intermediate entrance leg being connected to said exit leg by a third said loop thereby forming a sinuous path from the location of delivery of fluid by said pump to the location of emptying of said exit leg into said sump;

a plurality of spaced paddle wheels mounted on supports above said channel, each of said paddle wheels having a plurality of spaced substantially radially directed paddles conforming in shape to the space between said side walls and bottom wall of said channel and being spaced therefrom to inhibit any contact therewith and to permit water to continuously flow between said paddles of each wheel and said channel;

a plurality of generators being driven by said plurality of said paddle wheels; and utilization of storage means for using or storing the energy harnessed by said generators.

2. The system of claim 1 wherein said paddle wheels in said exit legs are offset from said paddle wheels in said entrance legs, a plurality of elongated shafts respectively connecting aligned paddle wheels in said entrance legs, another plurality of elongated shafts respectively connecting aligned paddle wheels in said exit legs, said generators being respectively connected to said plurality and another plurality of said shafts.

* * * * *